Dec. 11, 1923.  1,477,206

B. H. BLOOD

WORK SUPPORT FOR MEASURING MACHINES

Filed Dec. 3, 1921

Inventor
Bryant H. Blood,
By Joseph K. Schofield
Attorney

Patented Dec. 11, 1923.

1,477,206

UNITED STATES PATENT OFFICE.

BRYANT H. BLOOD, OF HARTFORD, CONNECTICUT, ASSIGNOR TO PRATT & WHITNEY COMPANY, OF NEW YORK, N. Y., A CORPORATION OF NEW JERSEY.

WORK SUPPORT FOR MEASURING MACHINES.

Application filed December 3, 1921. Serial No. 519,732.

*To all whom it may concern:*

Be it known that I, BRYANT H. BLOOD, a citizen of the United States, and a resident of Hartford, in the county of Hartford and State of Connecticut, have invented certain new and useful Improvements in Work Supports for Measuring Machines, of which the following is a specification.

This invention relates to measuring machines and in particular to a bench type of measuring machine having a table or other suitable supporting member for the work or specimens being measured. An object of the present invention is to provide a supporting member or table for the specimens being measured which may be conveniently and quickly secured to the base and which may be readily removed from operative position when a support is not needed.

One feature which enables me to accomplish the above object is that the supporting member is in the form of a table having a flat upper surface and having a lower portion formed to engage and partly surround the base of the measuring machine. Another feature which is advantageous is that the securing means for this supporting member comprises opposed members which may be moved into contact with the sides or walls of a longitudinally extending spline provided in the upper surface of the base, one of these opposed members being movable relative to the other to clamp or unclamp the supporting member.

Another feature that is advantageous is the operation of the securing means which always assures the supporting member being brought into exactly the same position each time it is clamped in position. Preferably only one of the opposed members is moved during the clamping operation and an abutment on the supporting member held in fixed position is drawn into contact with the side of the spline extending longitudinally along the base of the machine.

With these and other objects in view my invention consists in the features of construction and operation set forth in the following specification and illustrated in the accompanying drawing.

In the accompanying drawing annexed hereto and forming a part of this application, I have shown my invention embodied in a linear measuring machine, but it will be understood that the invention can be otherwise embodied and that the drawing is not to be construed as defining or limiting the scope of the invention, the claims appended to this specification being relied upon for that purpose.

Figure 1:
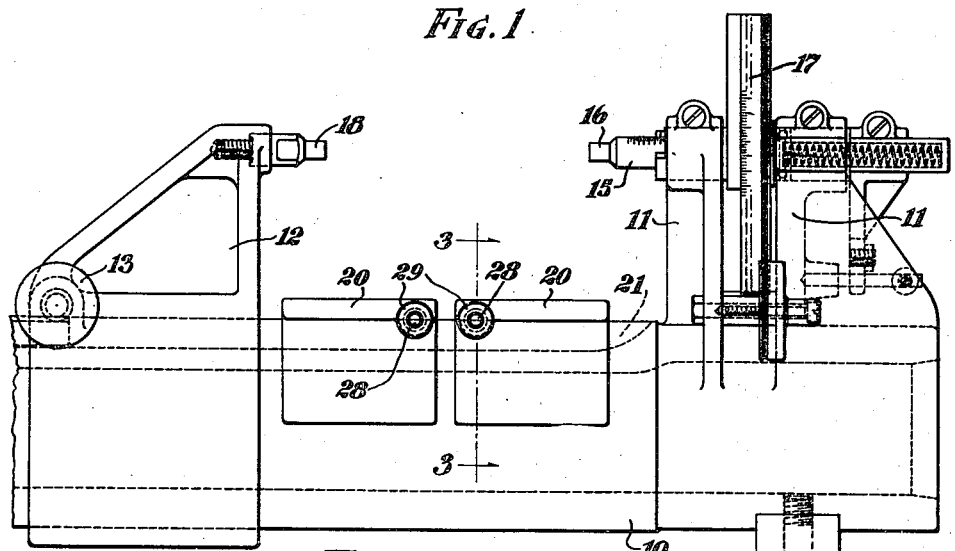
Figure 1 is a front elevation of the measuring machine having two specimen supporting members applied thereto.
Figure 2:
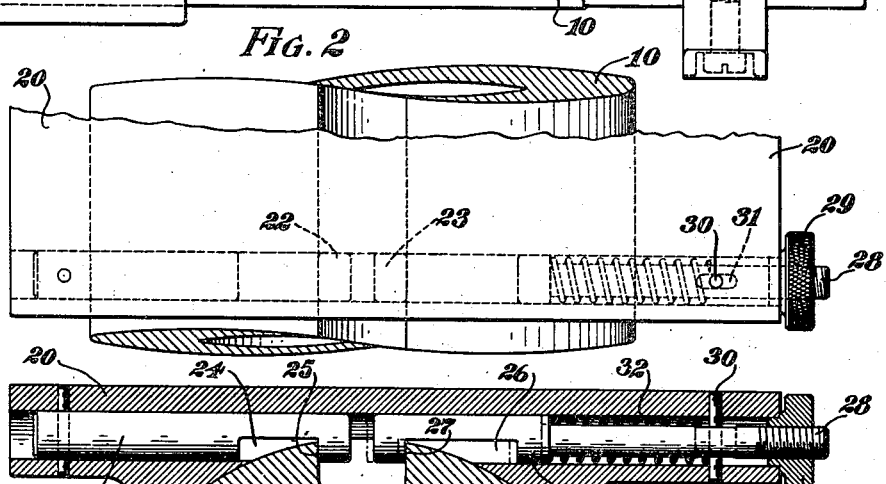
Fig. 2 is a fragmentary view upon an enlarged scale of a part of the measuring machine base and supporting means.
Figure 3:
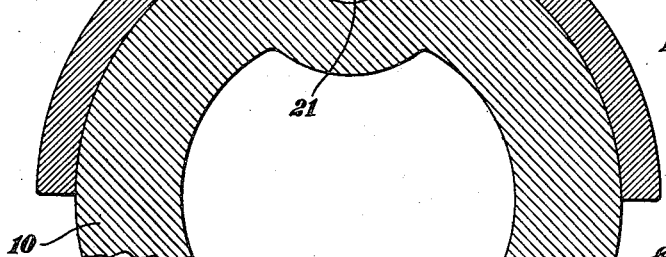
Fig. 3 is a sectional view of the base and supporting means taken upon line 3—3 of Fig. 1.

In the above mentioned drawing, I have shown but one modification of the invention which is now deemed preferable but it is to be understood that changes and modifications may be made within the scope of the appended claims without departing from the spirit of the invention.

Briefly, my invention in its broadest aspect comprises the following principal parts: First, a measuring machine having a suitably formed base having heads mounted thereon, anvils being provided in said heads which may be adjusted or positioned to contact with the specimen being measured; second, a table or support for the specimen mounted on the base and preferably having its lower surface formed to engage and partly surround the base; third, securing means for clamping the table to the base; and fourth, operating means to tighten and loosen the securing means.

Referring more in detail to the figures of the drawing, a measuring machine is shown which is provided with a suitably formed base 10 having a fixed head 11 secured or formed integrally therewith at one end. A movable head 12 is also mounted on the base which may be adjusted to any desired position along the base by the knurled nut 13. The fixed head 11 has a measuring spindle 15 therein which may be adjusted axially by rotation of a graduated dial 17. On the forward end of measuring spindle 15 is an anvil 16. A fixed anvil 18 is provided on the movable head 12 so that by suitably adjusting the position of the movable head 12 along the base in connection with a standard end measure, measurements may be taken of specimens over an extended range and to a high precision by adjustment of the measuring spindle 15. The particular form of measuring machine disclosed in this application is similar to that described and claimed in applicant's copending application No. 519,731 filed of even date herewith so that further description of the measuring machine itself will not be required.

In order to support the specimen being measured in operative position between the anvils 16 and 18 of the measuring machine, I provide a suitable support or table 20 positioned on the base between these anvils. Preferably two similar tables are provided, one only being used when the movable head 12 is closely adjacent the fixed head 11 and both being used when measurements are being taken of larger sizes of specimens. This support 20 as shown comprises a table the upper surface of which is suitably finished to a plane and the lower surface of which is formed to partially surround the base. In the form shown, the base is cylindrical and the lower part of the support or table 20 extends approximately one half around the base.

In order to secure the support 20 to the base 10 quickly and in a manner which will bring it always into the same position and prevent any movement of the support when clamped the following securing means is provided. These means, as shown, engage a spline 21 extending longitudinally along the upper surface of the base 10. By using this spline 21 to secure the support 20 in fixed position, the support 20 may be readily lifted from the base 10 after the securing means have been unclamped and, when the securing means are operated to clamp the support in position, it is always brought into exactly the same position relative to the base.

The securing means for the support or table 20 comprise two opposed members in the form of rods 22 and 23 extending transversely of the table or support 20 one of these being pinned in position in a suitable hole extending transversely of the support 20. A portion of the rod 22 is suitably cut away on one side as at 24 so that an abutment 25 is provided which may contact with one of the sides or walls of the spline 21 in the base 10. The other rod member 23 has a cutaway portion 26 forming an abutment 27 opposed to the abutment 25 in the first mentioned rod 22 and adapted to engage the opposite side or wall of the spline 21. This member 23 which is also in the form of a rod is extended to the forward vertical surface of the support 20 and is provided with a threaded portion 28 engaged by a suitably knurled nut 29. Rotation of this knurled nut 29 will therefore draw the member 23 toward the right so that the abutment 27 will tightly engage the wall or side in the spline 21. Preferably this member 23 is pinned to hold it in proper position. The pin 30 is secured in the table 20 as shown and engages an elongated opening 31 in the securing member or rod 23, thus permitting a slight axial movement of this member 23. Also, preferably, a coil spring 32 surrounds the extended portion of this securing member 23 and bears against the pin 30 so that the securing member 23 is always forced toward its unclamped position.

It will be seen therefore that when the knurled nut 29 is rotated to unclamp the supporting member 20, the securing member or rod 23 is moved to the left by the spring 32 thus permitting ready removal of the support 20 from the base 10. When this knurled nut 29 is rotated to move the member 23 to the right to its clamping position, the opposite member or rod 22 is drawn tightly against one side of the spline 21 while member 23 is drawn tightly into engagement with the right hand side of the spline 21. Thus, when in clamped position, the table or support 20 is held in fixed position, without liability of movement as by tilting and is always brought into exactly the same predetermined position when the securing means 22 and 23 are in clamped position.

What I claim is:

1. A work support for measuring machines comprising in combination, a member having a flat upper surface and a lower surface adapted to engage the base of a measuring machine, oppositely extending securing means provided in said member engaging opposed surfaces provided on said base, and means to operate said securing means to clamp or unclamp said member.

2. A work support for measuring machines comprising in combination, a member having a flat upper surface and a lower surface adapted to engage the base of a measuring machine, oppositely extending securing means provided in said member engaging opposed surfaces on said base normal to the surface of said member, and means to operate said securing means to clamp or unclamp said member.

3. A work support for measuring machines comprising in combination, a member having a flat upper surface and a lower surface adapted to engage the base of a measuring machine, oppositely extending securing means provided in said member comprising abutments engaging opposed surfaces on said base, and means to operate said securing means to clamp or unclamp said member.

4. A work support for measuring machines comprising in combination, a member having a flat upper surface and a lower surface adapted to engage the base of a measuring machine, securing means provided in said member comprising rods having abutments engaging opposed surfaces on said base, and means to operate said securing means to clamp or unclamp said member.

5. A work support for measuring machines comprising in combination, a member having a flat upper surface and a lower surface adapted to engage the base of a measuring machine, securing means provided in said member comprising rods having abutments engaging opposed surfaces on said base normal to the surface of said member, and means to operate said securing means to clamp or unclamp said member.

6. A work support for measuring machines comprising in combination, a member having a flat upper surface and a lower surface adapted to engage the base of a measuring machine, securing means provided in said member comprising rods having abutments engaging opposed surfaces on said base, normal to the surface of said member, and means to adjust one of said rods to clamp said abutments against said opposed surfaces whereby said member is held securely in position on said base.

7. A measuring machine comprising in combination, a base having a longitudinal spline therein, a fixed head and a movable head on said base having measuring anvils thereon, a work support mounted on said base, securing means for said support comprising members having oppositely disposed abutments engaged by the walls of said spline, and means to tighten said securing means to firmly engage said opposed abutments with the walls of said spline whereby said support is held firmly in predetermined position on said base.

8. A measuring machine comprising in combination, a base having a longitudinal spline therein, a fixed head and a movable head on said base having measuring anvils thereon, a work support mounted on said base, securing means for said support comprising members having oppositely disposed abutments engaged by the walls of said spline, and means to adjust the position of one of said abutments to said securing means to firmly engage said opposed members with the walls of said spline whereby said support is held firmly in position on said base.

9. A measuring machine comprising in combination, a base havng a longitudinal spline therein, a fixed head and a movable head on said base having measuring anvils thereon, a work support mounted on said base, securing means for said support comprising oppositely disposed rods having cutaway portions forming opposed abutments, and means to tighten said securing means to firmly engage the abutments on said oppositely opposed rods with the walls of said spline whereby said support is held firmly in position on said base.

10. A measuring machine comprising in combination, a base having a longitudinal spline therein, a fixed head and a movable head on said base having measuring anvils thereon, a work support mounted on said base comprising a member having a flat upper surface and a lower surface adapted to engage said base, securing means for said support comprising oppositely disposed members having abutments engaging the walls of said spline, and means to tighten said securing means to firmly engage said opposed members with the walls of said spline whereby said support is held firmly in position on said base.

11. A measuring machine comprising in combination, a cylindrical base having a longitudinal spline therein, a fixed head and a movable head on said base having measuring anvils thereon, a work support mounted on said base comprising a member having a flat upper surface and a lower surface adapted to engage and partly surrounding said base, securing means for said support comprising oppositely disposed members having abutments engaging the walls of said spline, and means to tighten one of said securing means to firmly engage said opposed members with the walls of said spline whereby said support is held firmly in accurately adjusted position on said base.

In testimony whereof, I hereto affix my signature.

BRYANT H. BLOOD.